US006568968B2

(12) United States Patent
Matsuda

(10) Patent No.: US 6,568,968 B2
(45) Date of Patent: May 27, 2003

(54) JET-PROPULSIVE WATERCRAFT AND CRUISING SPEED CALCULATING DEVICE FOR WATERCRAFT

(75) Inventor: Yoshimoto Matsuda, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/921,373

(22) Filed: Aug. 2, 2001

(65) Prior Publication Data

US 2002/0016112 A1 Feb. 7, 2002

(30) Foreign Application Priority Data

Aug. 2, 2000 (JP) ....................................... 2000-234032

(51) Int. Cl.[7] ................................................ B60K 41/00
(52) U.S. Cl. .......................... 440/87; 440/1; 114/144 R
(58) Field of Search ................................ 440/1, 74–81, 440/87, 38; 114/144 R, 144 RG

(56) References Cited

U.S. PATENT DOCUMENTS

| | | | | |
|---|---|---|---|---|
| 6,159,059 A | * 12/2000 | Bernier et al. | ........... | 114/55.52 |
| 6,336,833 B1 | * 1/2002 | Rheault et al. | ......... | 114/144 R |
| 6,371,819 B1 | * 4/2002 | Ozawa et al. | ................ | 123/336 |
| 6,405,669 B2 | * 6/2002 | Rheault et al. | ......... | 114/144 R |

FOREIGN PATENT DOCUMENTS

| | | |
|---|---|---|
| JP | P2001-191992 A | 7/2001 |

* cited by examiner

*Primary Examiner*—Jesus D. Sotelo
(74) *Attorney, Agent, or Firm*—Marshall, Gerstein & Borun

(57) ABSTRACT

The present invention provides a lightweight and simply-configured watercraft of a jet-propulsion type, which can maintain steering capability according to a cruising speed of the watercraft even while a throttle-close operation is performed and the amount of water ejected from a water jet pump is thereby reduced, and a cruising speed calculating device suitable for the watercraft. During forward movement, when the throttle-close operation and steering operation of a steering handle are detected and a cruising speed is within a predetermined speed range, the engine speed is increased. The engine speed is increased by changing a fuel injection timing of a fuel injection system, a fuel injection amount, and/or an ignition timing of an ignition system of the engine. The cruising speed is calculated from the engine speed.

24 Claims, 15 Drawing Sheets

JET-PROPULSIVE WATERCRAFT AND CRUISING SPEED CALCULATING DEVICE FOR WATERCRAFT

BACKGROUND OF THE INVENTION

1. Field of the Invention

The present invention relates to a jet-propulsion watercraft which ejects water rearward and planes on a water surface as the resulting reaction. More particularly, the present invention relates to a jet-propulsion watercraft, which can maintain steering capability even when the throttle is operated in the closed position and propulsion force is thereby reduced, and a cruising speed calculating device suitable for the watercraft.

2. Description of the Related Art

In recent years, so-called jet-propulsion personal watercraft (PWC) have been widely used in leisure, sport, rescue activities, and the like. The personal watercraft is configured to have a water jet pump that pressurizes and accelerates water sucked from a water intake generally provided on a bottom of a hull and ejects it rearward from an outlet port. Thereby, the personal watercraft is propelled.

In the personal watercraft, in association with a steering handle of a general bar type, a steering nozzle provided behind the outlet port of the water jet pump is swung either to the right or left, to change the ejecting direction of the water to the right or to the left, thereby turning the watercraft.

A deflector is retractably provided behind the steering nozzle for blocking the water ejected from the steering nozzle. The deflector is moved downward to deflect the ejected water forward, and as the resulting reaction, the personal watercraft moves rearward. In some watercraft, in order to move rearward, a water flow is formed so as to flow from an opening provided laterally of the deflector along a transom board to reduce the water pressure in an area behind the watercraft.

In the above-described personal watercraft, when the throttle is moved to a substantially fully closed position and the water ejected from the water jet pump is thereby reduced, during forward movement and rearward movement, the propulsion force necessary for turning the watercraft is correspondingly reduced, and the steering capability of the watercraft is therefore reduced until the throttle is re-opened.

To solve the above-described condition with a mechanical structure, the applicant disclosed a jet-propulsion personal watercraft comprising a steering component for an auxiliary steering system which operates in association with the steering handle in addition to a steering nozzle for the main steering system in Japanese Patent Application No. Hei. 2000-6708.

SUMMARY OF THE INVENTION

The present invention addresses the above-described condition, and an object of the present invention is to provide a jet-propulsion watercraft, which can maintain steering capability according to the cruising speed thereof even when the operation which closes the throttle (hereinafter referred to as "throttle-close operation") is performed and the amount of water ejected from a water jet pump is thereby reduced, and a cruising speed calculating device suitable for the watercraft.

According to the present invention, there is provided a jet-propulsion watercraft comprising: a water jet pump that pressurizes and accelerates sucked water and ejects the water from an outlet port provided behind the water jet pump to propel the watercraft as a reaction of the ejecting water; an engine for driving the water jet pump; a steering operation means that operates in association with a steering nozzle of the water jet pump; a steering position sensor for detecting a predetermined steering position of the steering operation means; an engine speed sensor for detecting an engine speed of the engine; a cruising speed calculating means for calculating a cruising speed of the watercraft based on the engine speed detected by the engine speed sensor; and an electric control unit, wherein the electric control unit is adapted to increase the engine speed while a result detected by the steering position sensor is the predetermined steering position and a value calculated by the cruising speed calculating means is within a predetermined speed range.

According to the jet-propulsion watercraft, the engine speed is increased while the watercraft is steered, this operation is detected by the steering position sensor, and while the cruising speed calculated by the cruising speed calculating means based on the engine speed detected by the engine speed sensor is within a predetermined speed range. Therefore, the water sufficient to turn the watercraft is ejected from the water jet pump, and the steering capability can be maintained even when the throttle-close operation is performed.

Thus, a personal watercraft without a so-called cruising speed sensor can be placed in a steered state adapted to the actual cruising speed. In addition, since the cruising speed employed in the control process can be calculated from the engine speed, the personal watercraft is capable of obtaining the cruising speed without the normal cruising speed sensor, for example, the conventional hydraulic cruising speed sensor which tends to be clogged with contamination in water.

Herein, control for increasing the engine speed is referred to as "steering assist mode control", and the "throttle-close operation" means that operation is performed to bring the throttle toward a closed position by a predetermined amount or more.

In the jet-propulsion watercraft, the cruising speed calculating means may include a speed conversion table that stores relationship between the engine speed and the cruising speed and is adapted to refer to the speed conversion table based on the detected engine speed to read out the cruising speed.

In the jet-propulsion watercraft, the cruising speed calculating means may further include: an offset table that stores an offset value used for offsetting the cruising speed stored in the speed conversion table according to a degree of acceleration/deceleration of the engine; and an obtaining means for obtaining the degree of acceleration/deceleration of the engine, and the cruising speed read from the speed conversion table can be offset according to the degree of acceleration/deceleration of the engine. Specifically, the cruising speed calculating means offsets the cruising speed by addition/subtraction based on the offset value read from the offset table and the cruising speed read from the speed conversion table. Thereby, a more accurate cruising speed in view of the inertia of the watercraft can be obtained.

In the jet-propulsion watercraft, the obtaining means for obtaining the degree of acceleration/deceleration of the engine may comprise: an engine speed memory for sequentially storing the engine speed detected by the engine speed sensor; a calculating means for calculating a difference value between two engine speeds stored in the engine speed memory; a difference value memory for sequentially storing the calculated difference value; and a cumulating means for cumulating the difference values stored in the difference value memory, and the degree of acceleration/deceleration of the engine can be calculated based on a cumulated value. The term "sequentially" is herein defined as "in time sequence". It should be noted that all of the engine speeds detected by the engine speed sensor in predetermined time cycles may be stored in the engine speed memory or they may be partially stored therein. Further, the engine speed sensor may detect the engine speed for every control clock or partially detect the engine speed.

The degree of acceleration/deceleration of the engine may be obtained indirectly by the calculation as described above, or otherwise may be obtained directly from a transducer provided on a crankshaft of the engine.

The jet-propulsion watercraft may further contain a throttle-close operation sensor for detecting throttle-close operation, and the engine speed can be increased while the steering operation is detected by the steering position sensor, the throttle-close operation is detected by the throttle-close operation sensor, and the value calculated by the cruising speed calculating means is within a predetermined speed range.

Also, the engine speed can be increased while the steering operation is detected by the steering position sensor, a decrease of a predetermined engine speed, i.e., the throttle-close operation is detected from the result detected by the engine speed sensor, and the value calculated by the cruising speed calculating means is within a predetermined speed range.

In this case, when the cruising speed becomes the predetermined speed after the throttle-close operation, transition to the steering assist mode control takes place. Therefore, the steering assist mode control can be effectively started according to the speed of the watercraft.

In the jet-propulsion watercraft, the throttle-close operation may be detected by a throttle position sensor.

It should be noted that the throttle-close operation sensor of the present invention is not limited to the engine speed sensor and the throttle position sensor. For example, it is possible to use a sensor placed in a system connecting a throttle lever and a throttle valve for detecting operation of the system when the throttle-close operation is performed. Also, it is possible to use a sensor for detecting an air-intake pressure and an air-intake amount of the engine.

Under the steering assist mode control, the engine speed can be increased by changing at least any of a fuel injection timing of a fuel injection system of the engine, an ignition timing of an ignition system of the engine, and a fuel injection amount of the fuel injection system of the engine. In this case, the engine speed can be increased without actual operation of the throttle.

It is preferable that the engine speed is increased up to approximately 2500 rpm–3500 rpm as an upper limit under the steering assist mode control.

It is preferable that the steering assist mode control is not executed particularly while the engine speed is within an idling range while the watercraft is moving forward because this is unnecessary. The idling range is defined as the range from the idling speed to a speed slightly higher than the idling speed and is preferably below approximately 2500 rpm.

The steering assist mode control may be executed even while the watercraft is moving rearward. In this case, it is preferable that the control is executed even while the engine speed is within the idling range.

According to the present invention, there is also provided a cruising speed calculating device used for a jet-propulsion watercraft provided with a water jet pump that pressurizes and accelerates sucked water and ejects the water from an outlet port provided behind the water jet pump to propel the watercraft as a reaction of the ejecting water, comprising: an engine speed sensor for detecting an engine speed of an engine for driving the water jet pump; and a cruising speed calculating means for calculating a cruising speed based on the engine speed detected by the engine speed sensor, wherein the cruising speed calculating means includes a speed conversion table that stores relationship between the engine speed and the cruising speed and is adapted to refer to the speed conversion table based on the detected engine speed to read out the cruising speed.

The cruising speed calculating device of the present invention provides a cruising speed detecting means suitable for the personal watercraft which does not comprise the conventional hydraulic cruising speed sensor subjected to contamination in water.

In the cruising speed calculating device, the cruising speed calculating means may comprise: an offset table that stores an offset value used for offsetting the cruising speed stored in the speed conversion table according to a degree of acceleration/deceleration of the engine; and an obtaining means for obtaining the degree of acceleration/deceleration of the engine, and the cruising speed read from the speed conversion table may be offset based on the offset value read from the offset table. Specifically, the cruising speed calculating means performs offset by addition/subtraction of the cruising speed read from the speed conversion table. Thereby, a more accurate cruising speed in view of the inertia of the watercraft can be obtained.

In the cruising speed calculating device, the obtaining means may include an engine speed memory for sequentially storing the engine speed detected by the engine speed sensor; a calculating means for calculating a difference value between two engine speeds stored in the engine speed memory; a difference value memory for sequentially storing the calculated difference value; and a cumulating means for cumulating the difference values stored in the different value memory, and the degree of acceleration/deceleration of the engine can be calculated based on a cumulated value. It should be noted that all of the engine speeds detected by the engine speed sensor in predetermined time cycles may be stored in the engine speed memory or they may be partially stored therein. Further, the engine speed sensor may detect the engine speed for every control clock or partially detect the engine speeds.

The degree of acceleration/deceleration of the engine may be obtained indirectly by the calculation as described above, or otherwise may be obtained directly from a transducer provided on a crankshaft of the engine.

The above and further objects and features of the invention will more fully be apparent from the following detailed description with accompanying drawings.

DETAILED DESCRIPTION OF THE PREFERRED EMBODIMENT

Hereinafter, a jet-propulsion watercraft according to an embodiment of the present invention and a cruising speed calculating device suitable for the watercraft will be described with reference to accompanying drawings. In this embodiment, a personal watercraft will be described.

Figure 1:
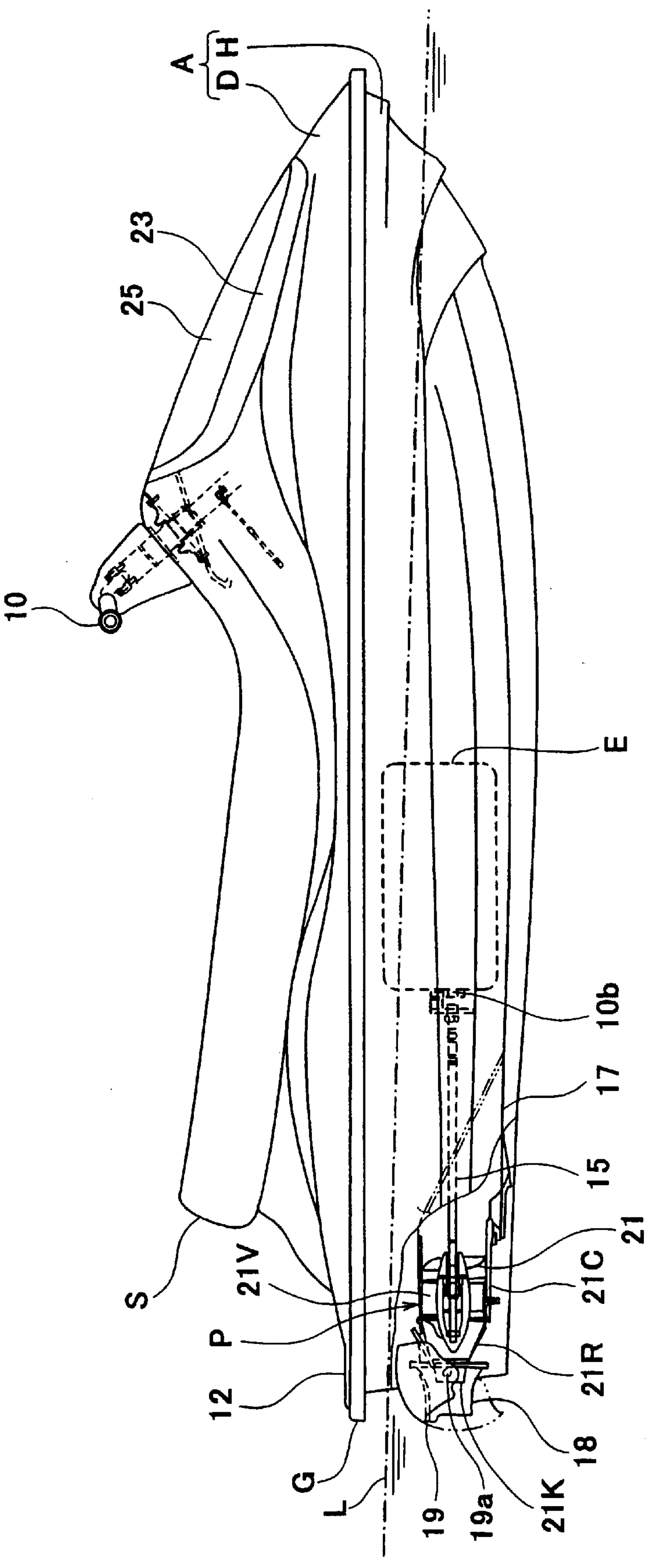
FIG. 1 is a side view showing an entire personal watercraft with a steering mechanism according to an embodiment of the present invention.
Figure 2:
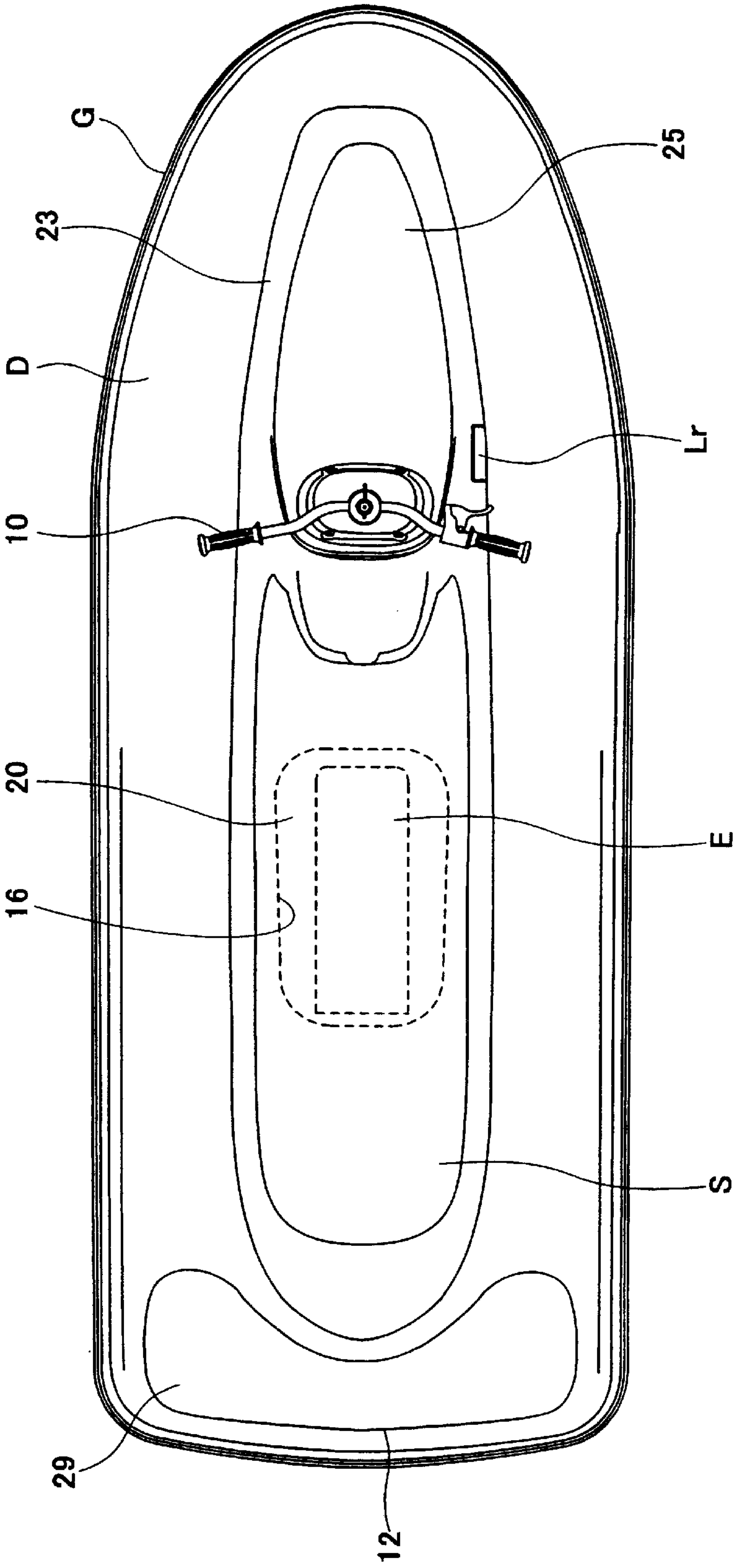
FIG. 2 is a plan view showing the entire personal watercraft of FIG. 1.

FIG. 1 is a side view showing an entire personal watercraft according to an embodiment of the present invention and FIG. 2 is a plan view of FIG. 1. Referring now to FIGS. 1, 2, reference numeral A denotes a body of the personal watercraft. The body A comprises a hull H and a deck D covering the hull H from above. A line at which the hull H and the deck D are connected over the entire perimeter thereof is called a gunnel line G. In this embodiment, the gunnel line G is located above a waterline L of the personal watercraft.

As shown in FIG. 2, an opening 16, which has a substantially rectangular shape seen from above, is formed at a relatively rear section of the deck D such that it extends in the longitudinal direction of the body A, and a riding seat S is provided above the opening 16 such that it covers the opening 16 from above. An engine E is provided in a chamber 20 surrounded by the hull H and the deck D below the seat S.

The engine E includes multiple cylinders (e.g., three-cylinders). As shown in FIG. 1, a crankshaft 10*b* of the engine E is mounted along the longitudinal direction of the body A. An output end of the crankshaft 10*b* is rotatably coupled integrally with a pump shaft of a water jet pump P through a propeller shaft 15. An impeller 21 is mounted on the pump shaft of the water jet pump P. The impeller 21 is covered with a pump casing 21C on the outer periphery thereof.

A water intake 17 is provided on the bottom of the hull H. The water is sucked from the water intake 17 and fed to the water jet pump P through a water intake passage. The water jet pump P pressurizes and accelerates the water. The pressurized and accelerated water is discharged through a pump nozzle 21R having a cross-sectional area of flow gradually reduced rearward, and from an outlet port 21K provided on the rear end of the pump nozzle 21R, thereby obtaining propulsion force. In FIG. 1, reference numeral 21V denotes fairing vanes for fairing water flow behind the impeller 21.

As shown in FIGS. 1, 2, reference numeral 10 denotes a bar-type steering handle as a steering operation means. The handle 10 operates in association with the steering nozzle 18 provided behind the pump nozzle 21R such that the steering nozzle 18 is swingable rightward or leftward. When the rider rotates the handle 10 clockwise or counterclockwise, the steering nozzle 18 is swung toward the respective opposite direction so that the watercraft can be turned to any desired direction when the water jet pump P is generating the propulsion force.

In FIGS. 1, 2, reference numeral 12 denotes a rear deck. The rear deck 12 is provided with an openable rear hatch cover 29. A rear compartment (not shown) with a small capacity is provided under the rear hatch cover 29. Reference numeral 23 denotes a front hatch cover. A front compartment (not shown) is provided under the front hatch cover 23 for storing equipment and the like. A hatch cover 25 is provided over the front hatch cover 23, thereby forming a two-layer cover. A life jacket and the like can be stored under the hatch cover 25 through an opening (not shown) provided in the rear end thereof.

As shown in FIG. 1, a bowl-shaped reverse deflector 19 is provided above the rear side of the steering nozzle 18 such that it can swing downward around a horizontally mounted swinging shaft 19*a*. In this embodiment, as shown in FIG. 2, a reverse switching lever Lr is provided in the vicinity of the handle 10 and at a portion of the body A that is forward of the handle 10 on the right side, for performing switching between forward movement and rearward movement of the watercraft.

Figure 3:
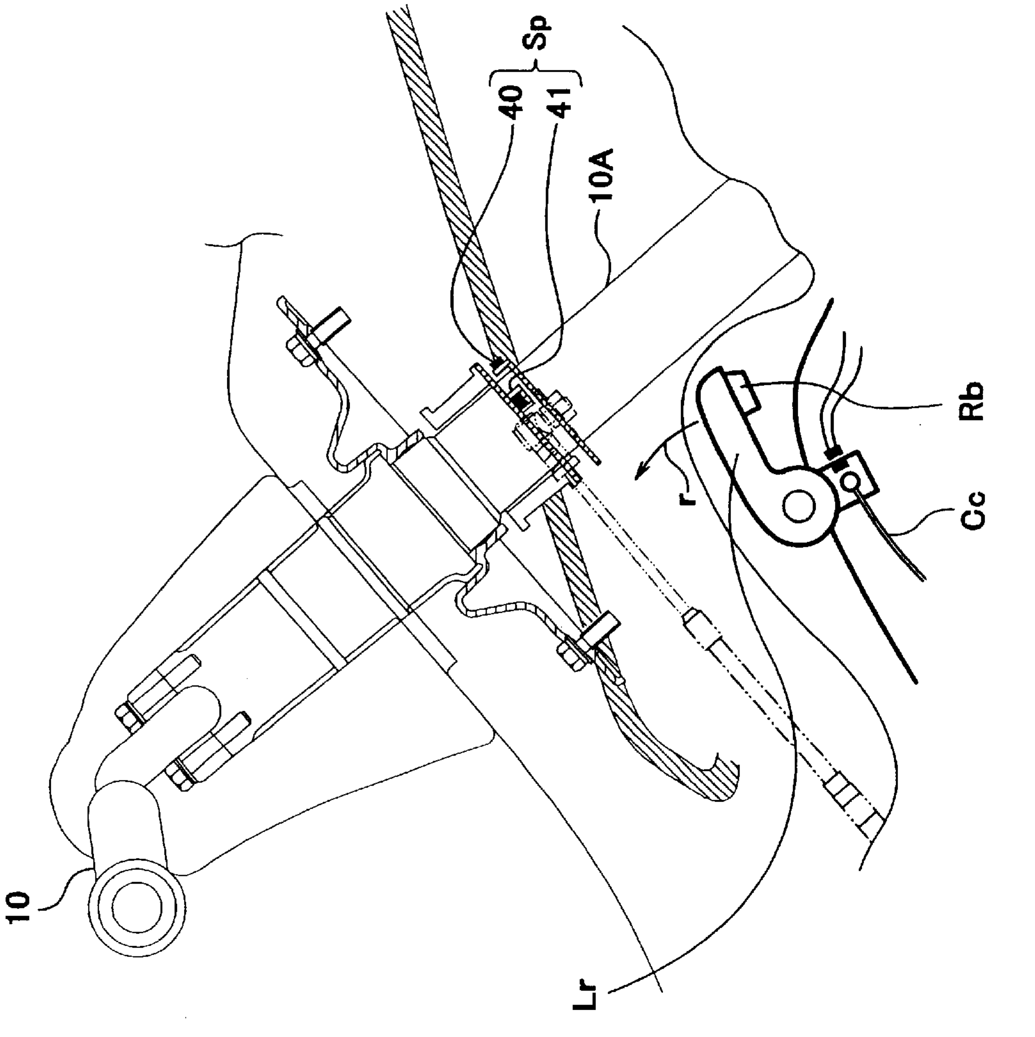
FIG. 3 is a partially enlarged cross-sectional view showing a steering mechanism of FIG. 1.

FIG. 3 is a partially enlarged cross-sectional view showing the steering mechanism of FIG. 1. As shown in FIG. 3, the reverse switching lever Lr is provided with a locking release button Rb at a tip end thereof for locking and releasing swing operation of the lever Lr. The rider presses the locking release button Rb and pivotally raises the reverse switching lever Lr as indicated by an arrow r around a swinging shaft, to pull a cable Cc connected at one end thereof to a base end of the reverse switching lever Lr. Thereby, the deflector 19 connected to the other end of the cable Cc is swung to a lower position rearward of the steering nozzle 18 and the water discharged rearward from the steering nozzle 18 is deflected forward. Thus, switching from forward movement to rearward movement is performed. In this state, upon the rider releasing the locking release button Rb, the raised position of the reverse switching lever Lr is locked and the watercraft is maintained in a rearward movement state. Then, in this state, when the rider re-presses the locking release button Rb and pivotally lowers the reverse switching lever Lr toward the opposite direction, the watercraft can move forward again.

Figure 4:
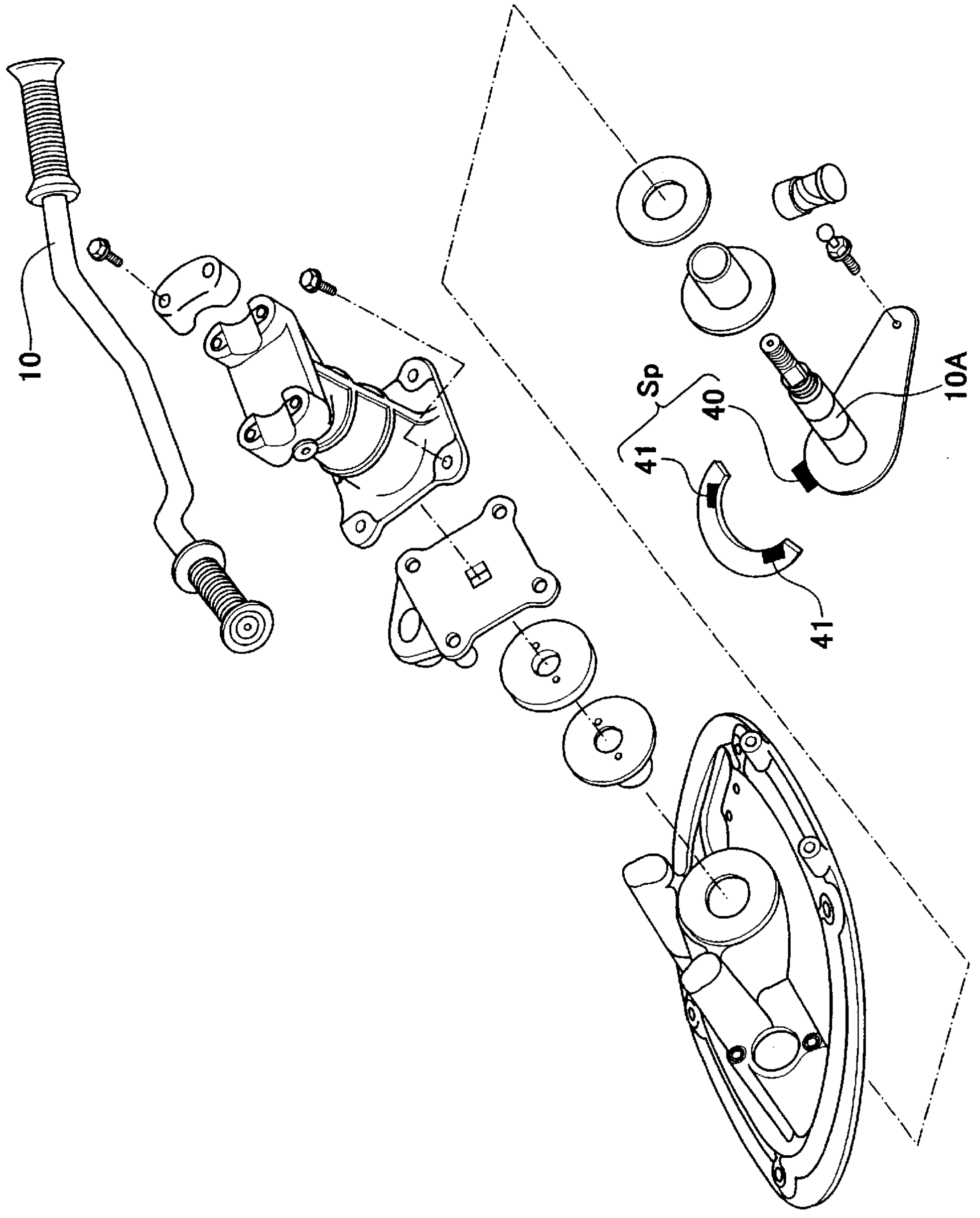
FIG. 4 is a partially exploded perspective view showing the steering mechanism of FIG. 3.

FIG. 4 is a partially exploded perspective view of the steering mechanism. In the personal watercraft of this embodiment, the steering mechanism is provided with a steering position sensor Sp. The steering position sensor Sp is constituted by a permanent magnet 40 and a pair of proximity switches 41. The permanent magnet 40 is attached to a portion of a circular-plate member fixed to a rotational shaft 10A of the steering handle 10. The proximity switches 41 are respectively provided at positions spaced apart from the permanent magnet 40 such that each of these switches forms a predetermined angle (for example, 20 degrees) clockwise or counterclockwise with respect to the permanent magnet 40. When the steering handle 10 is rotated by the predetermined angle and the permanent magnet 40 comes close to the corresponding proximity switch 41, the switch 41 is turned ON, thereby detecting steering operation. It should be noted that a potentiometer can be substituted for the position sensor Sp.

Figure 5:
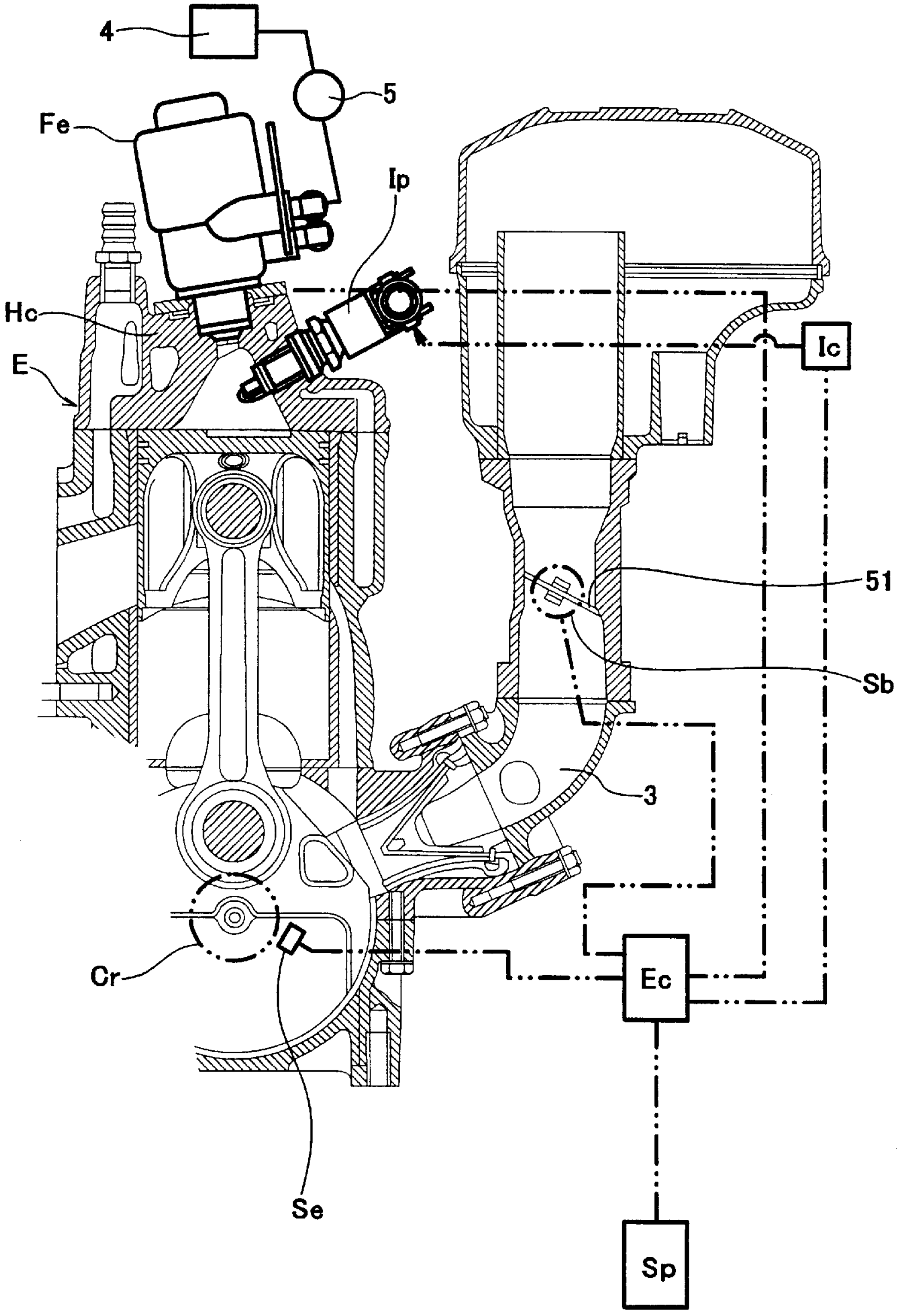
FIG. 5 is a cross-sectioned, partly schematic view showing a configuration of a control system of the personal watercraft according to the embodiment based on the relationship with the engine.
Figure 6:
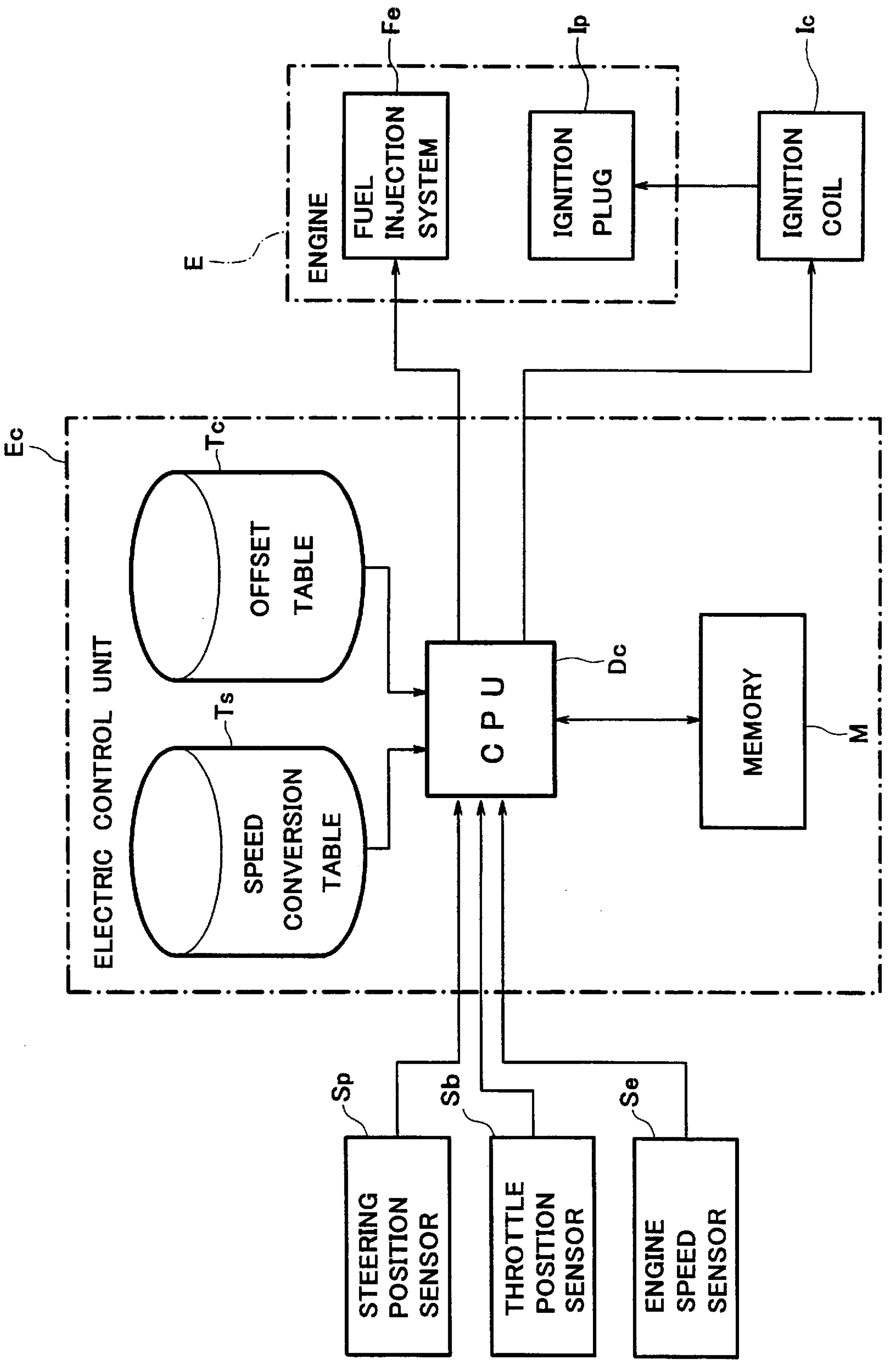
FIG. 6 is a block diagram showing the configuration of the control system of the personal watercraft according to one embodiment.

FIG. 5 is a view showing a configuration of a control system of the personal watercraft of this embodiment based on the relationship with the engine. FIG. 6 is a block diagram of the configuration of the control system of FIG. 5. As shown in FIGS. 5, 6, a throttle position sensor Sb is provided close to a butterfly valve 51 placed in an intake passage 3 of the engine E, for detecting that the butterfly valve 51 is closed to some degrees, i.e., throttle-close operation. An engine speed sensor Se is provided in the vicinity of the crankshaft Cr, for detecting the number of revolutions of the crankshaft Cr, i.e., the engine speed of the engine E.

The steering position sensor Sp, the throttle position sensor Sb, and the engine speed sensor Se are respectively connected to a CPU (central processing unit) Dc of an electric control unit Ec through signal lines (electric wires). A signal indicating that the steering operation, the throttle-close operation, or the engine speed has been detected by the steering position sensor Sp, the throttle position sensor Sb, or the engine speed sensor Se, is sent to the CPU Dc.

The CPU Dc is connected to a fuel injection system Fe provided in a cylinder head Hc of the engine E and an ignition coil Ic through signal lines (electric wires). The ignition coil Ic is connected to an ignition plug Ip of the engine E through an electric wire (high-tension cord). In FIG. 5, reference numeral 4 denotes a fuel tank and reference numeral 5 denotes a fuel pump.

Thus, the personal watercraft of this embodiment has the above-identified hardware configuration. As described below, when predetermined conditions such as the throttle-close operation occur, transition to the steering assist mode control takes place. The personal watercraft has a function of maintaining steering capability even while the throttle is placed in the closed state. This function is stored in a memory M (see FIG. 6) built in the electric control unit Ec as a computer program and performed by making the CPU Dc execute the computer program. Subsequently, a control process according to the computer program will be described with reference to flowcharts of FIGS. 7 through 9.

Figure 7:
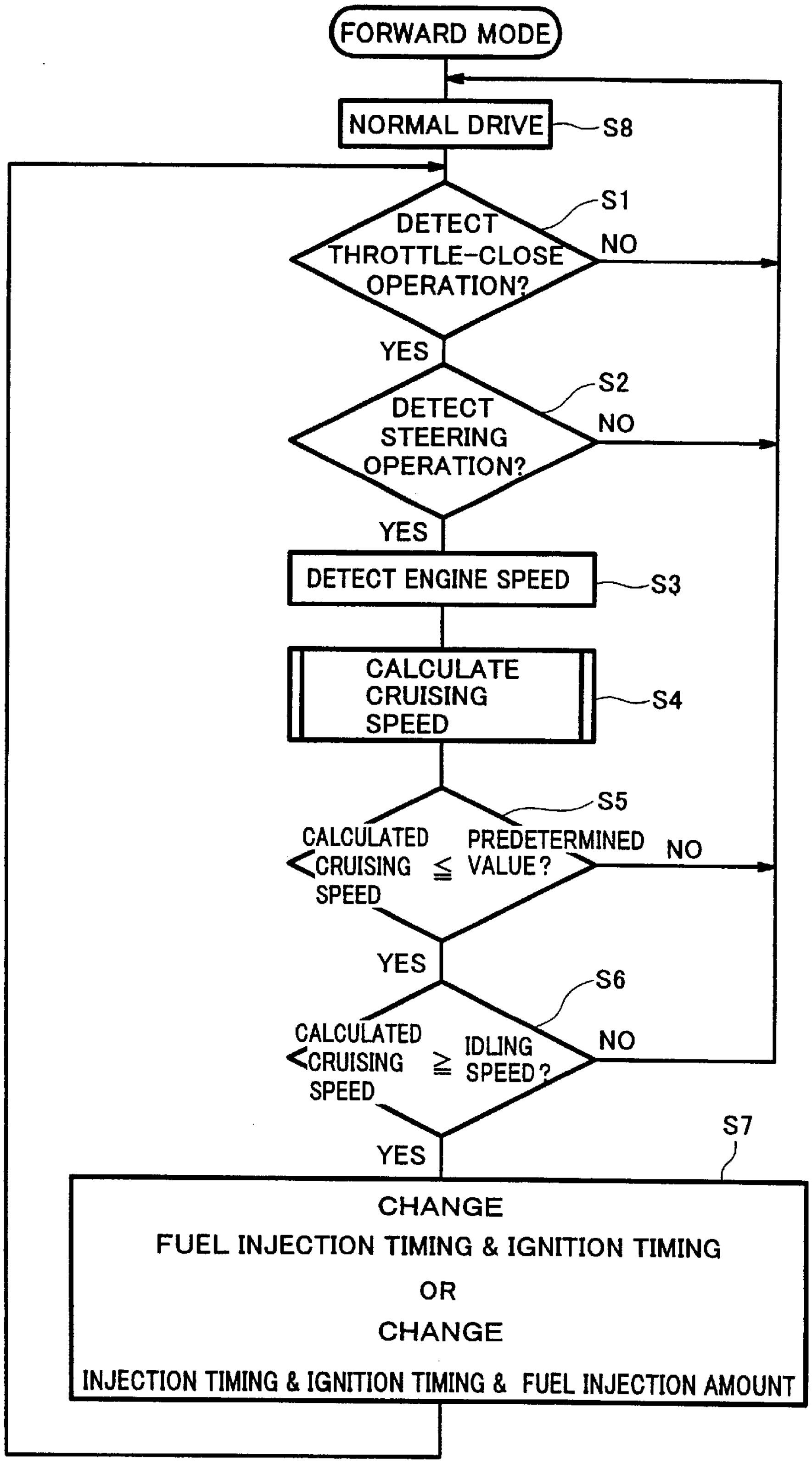
FIG. 7 is a flowchart showing a control process performed under steering assist mode control when the personal watercraft according to the embodiment is moving forward.

Referring to FIG. 7, the flowchart shows the control process performed by the CPU Dc under the steering assist mode control while the watercraft is moving forward. When the personal watercraft is moving forward, first of all, the CPU Dc judges whether or not the throttle position sensor Sb has detected that the rider performed the throttle-close operation (Step S1).

When judging that the throttle-close operation has been detected by the throttle position sensor Sb ("YES" in Step S1), the CPU Dc judges whether or not the steering position sensor Sp has detected that the rider rotated the steering handle 10 by the predetermined angle to the right or to the left (Step S2).

When judging that the steering operation has been detected by the steering position sensor Sp ("YES" in Step S2), the CPU Dc reads the engine speed detected by the engine speed sensor Se (Step S3), and calculates the cruising speed based on the read engine speed (Step S4) as described below.

Then, the CPU Dc judges whether or not the calculated cruising speed is smaller than a predetermined value (Step S5), and when judging that the calculated cruising speed is smaller than the predetermined value ("YES" in Step S5), the CPU Dc further judges whether or not the calculated cruising speed is larger than a cruising speed (idling speed) of the watercraft in an idling state (Step S6). This judgment is made to prevent the steering assist mode control from being executed in the idling state. This is because the propulsion force is unnecessary in the idling state in which the watercraft is not moving. The idling speed is a speed ranging from 0 km/h to a certain speed slightly higher than 0 km/h.

On the other hand, when judging that the throttle-close operation has not been detected ("NO" in Step S1), the steering operation has not been detected ("NO" in Step S2), the cruising speed is larger than the predetermined value ("NO" in Step S5), or the cruising speed is smaller than the idling speed ("NO" in Step S6), the CPU Dc maintains an initial drive state, i.e., a normal drive state (Step S8).

When judging that the cruising speed is larger than the idling speed ("YES" in Step S6), the CPU Dc starts executing the steering assist mode control to change the fuel injection timing and the ignition timing of the engine E, or these timings and the fuel injection amount (Step S7), thereby increasing the engine speed.

In this embodiment, in order to increase the engine speed, it is desirable to set faster injection timing and increase the fuel injection amount, but the present invention is not limited to these. Besides, in view of a turning characteristic of the personal watercraft, a characteristic due to the hull shape of the watercraft, and the like, the engine speed may be increased up to approximately 2500–3500 rpm. For example, the engine speed may be fixed at approximately 3000 rpm or may vary depending on a cruising state of the watercraft.

The CPU Dc repeats Steps S1–S7 until it judges "NO" in Step S1, S2, S5, or S6. When judging "NO", the CPU Dc sets back the fuel injection timing and the ignition timing of the engine E or these timings and the fuel injection amount, which were changed to increase the engine speed, to the initial drive state, i.e., the normal drive state (Step S8).

In judgment as to whether to start the steering assist mode control, alternatively, Steps 1, 2 may be performed in the reversed order. Also, according to the judgment in Step S2 and the judgment of the cruising speed in Steps S5, S6, the steering assist mode control may be started. Likewise, Steps S5, S6 may be performed in the reversed order. Also, Step S5 or S6 may be omitted. Further, Step S1 may be omitted and the judgment of the throttle-close operation may be made in Step S5 and/or Step S6.

Figure 8:
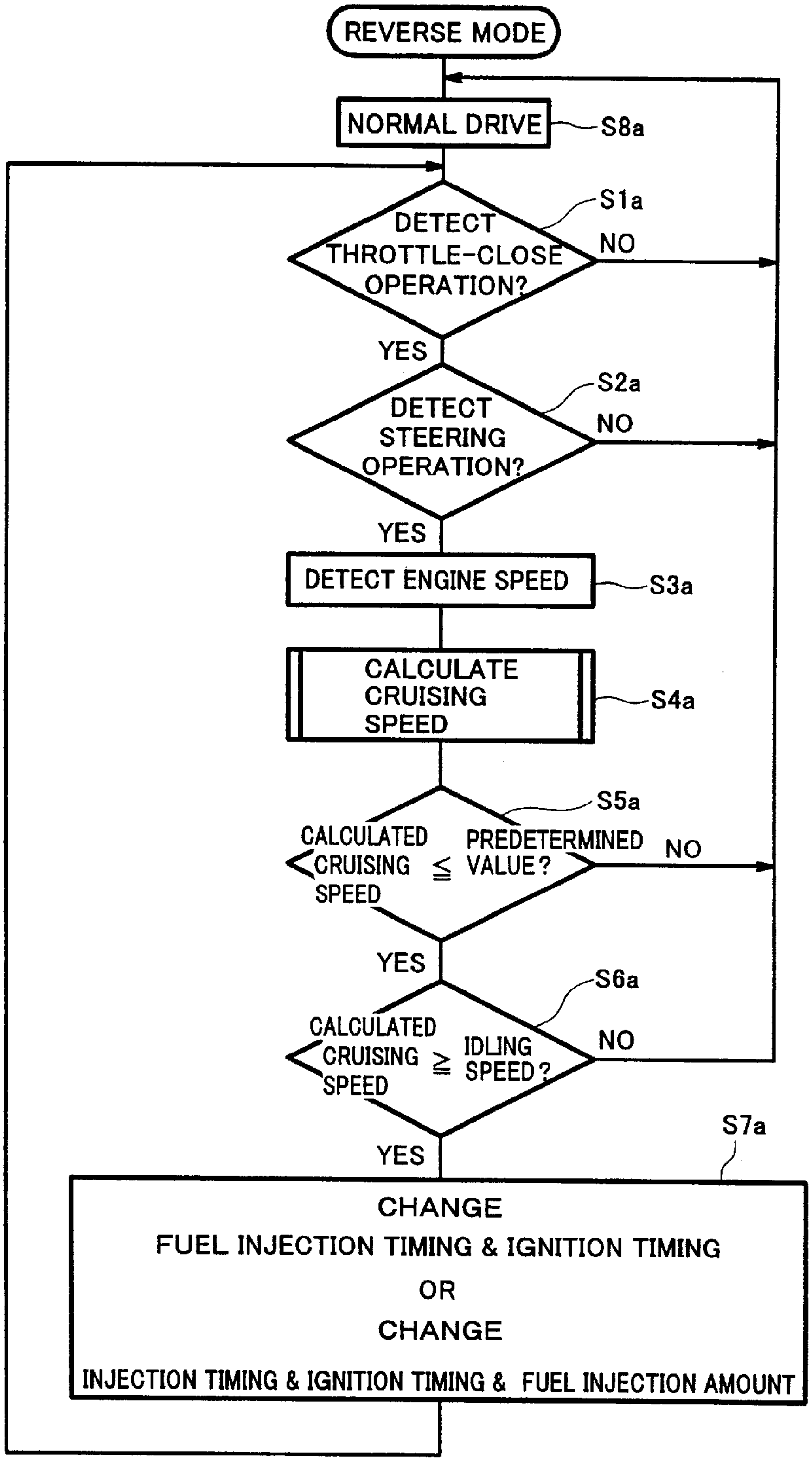
FIG. 8 is a flowchart showing a control process performed under steering assist mode control when the personal watercraft according to the embodiment is moving rearward.

When the rider is operating the reverse switching lever Lr to cause the watercraft to move rearward, the CPU Dc performs Steps S1*a*–S8*a* of FIG. 8 as in the case of the forward movement.

Figure 9:
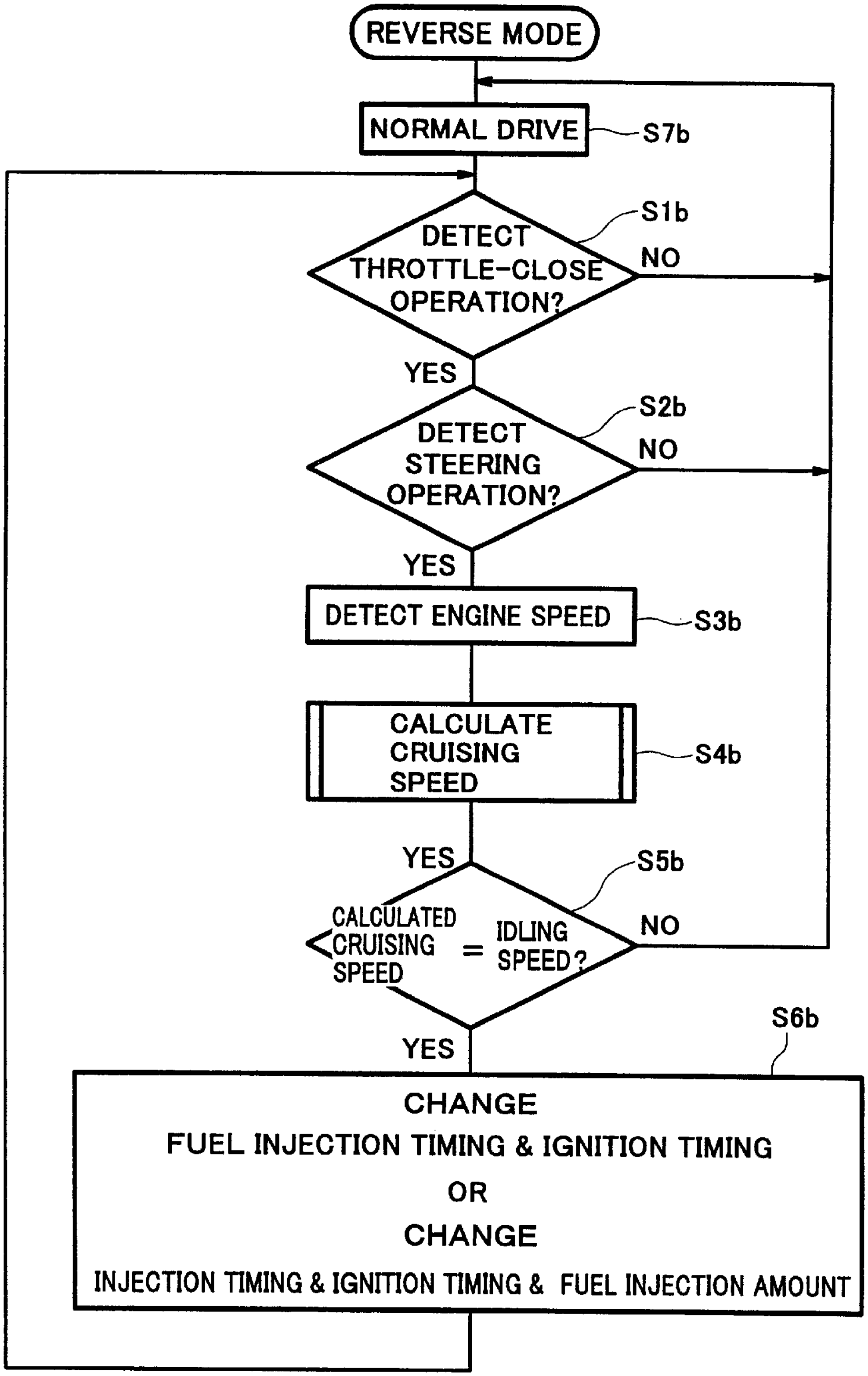
FIG. 9 is a flowchart showing another control process performed under steering assist mode control when the personal watercraft according to the embodiment is moving rearward.

The control process of FIG. 8 may be replaced by a control process shown in FIG. 9. Specifically, as shown in FIG. 9, like the control process described above, the CPU Dc first executes the detection of the throttle-close operation, the steering operation, and the engine speed, and the calculation of the cruising speed (Steps S1*b*–S4*b*), and then judges whether or not the calculated cruising speed is equal to the idling speed (Step S5*b*). When judging that the calculated cruising speed is equal to the idling speed ("YES" in Step S5*b*), the CPU Dc starts executing the steering assist mode control to change the fuel injection timing and the ignition timing of the engine E, or these timings and the fuel injection amount (Step S6*b*), thereby increasing the engine speed. On the other hand, when judging that the calculated cruising speed is not the idling speed ("NO" in Step S5*b*), the CPU Dc sets back the fuel injection timing and the ignition timing of the engine E, or these timings and the fuel injection amount, which were changed to increase the engine speed, to the initial drive state, i.e., the normal drive state (Step S7*b*).

In the control process performed by the CPU Dc of the electric control unit Ec shown in the above flow charts, calculation of the cruising speed is carried out as described below.

Figure 10:
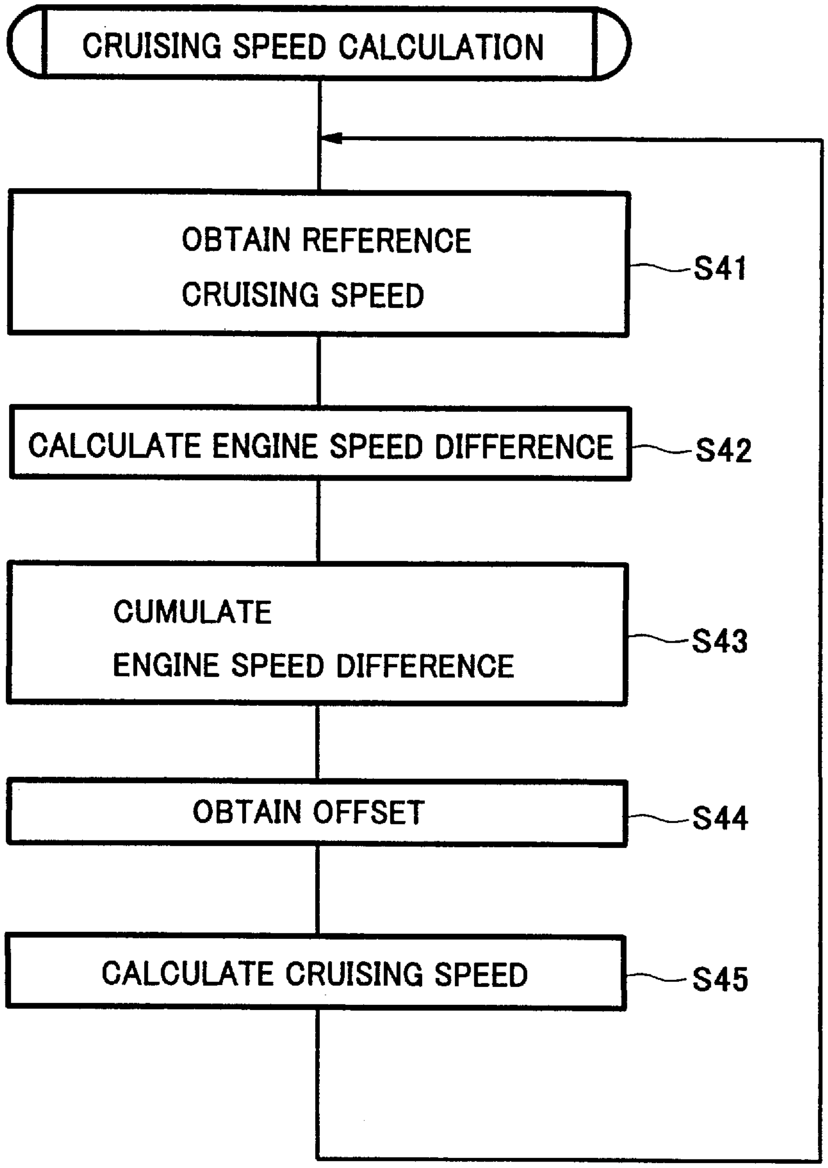
FIG. 10 is a flowchart showing a cruising speed calculating process under the steering assist mode control of the personal watercraft according to the embodiment.

Referring to FIG. 6, the electric control unit Ec has a speed conversion table Ts in which the cruising speeds (reference speeds) associated with the engine speeds are stored, and an offset table Tc used to offset the reference speed according to the degree of acceleration/deceleration of the engine speed. Referring to FIG. 10, the CPU Dc refers to the respective tables based on the engine speed detected by the engine speed sensor Se to calculate the cruising speed.

Figure 12:
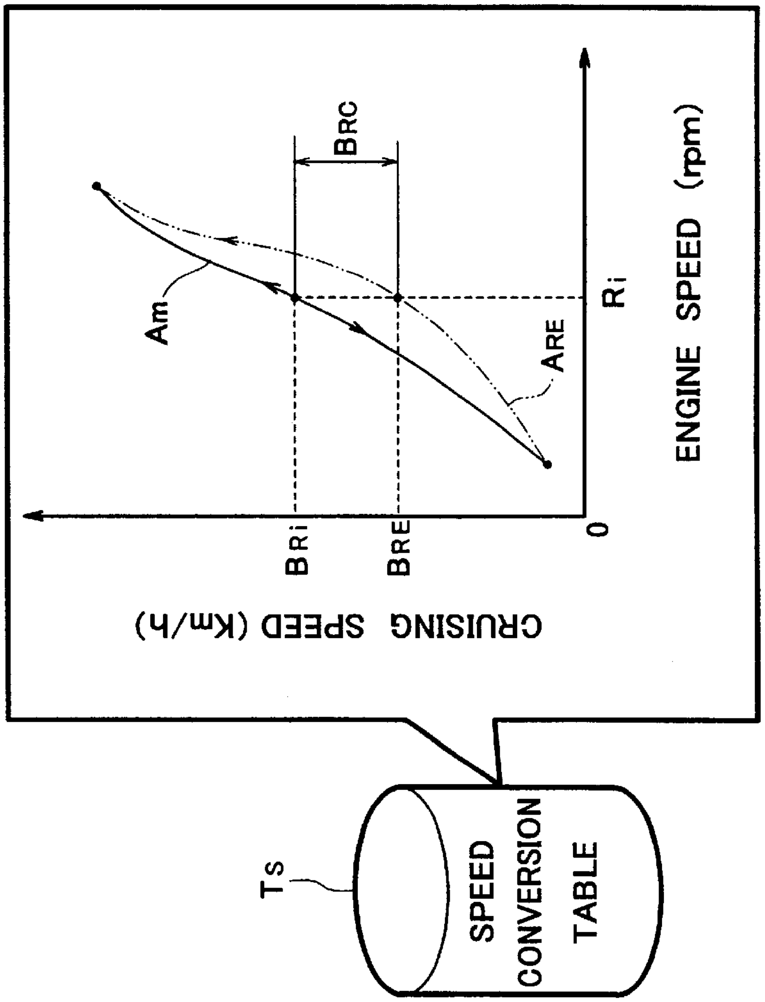
FIG. 12 is a graphic view showing contents of a speed conversion table of FIG. 6.

First, the CPU Dc refers to the speed conversion table Ts (see FIG. 12) based on the engine speed $R_i$ detected by the engine speed sensor Se and obtains a reference cruising speed $B_{Ri}$ associated with the engine speed $R_i$ (Step S41). As schematically shown in FIG. 12, the cruising speeds of the watercraft in so-called stationary cruising state in which the delay in response of the cruising speed with respect to the change in the engine speed is small are stored in the speed conversion table Ts as the reference cruising speeds. The reference cruising speeds are actually measured for various engine speeds in advance (see line $A_m$).

The CPU Dc sequentially stores the engine speed detected by the engine speed sensor Se in the memory M. The CPU Dc calculates a difference value $\Delta R_i$ between the engine speed stored at this time and the engine speed previously stored (Step S42), and sequentially stores the calculated difference value in the memory M. For the engine speeds stored in the memory M, the appropriate number and period of samplings are set in view of a capacity of the memory M, and the calculation speed or the like of the CPU Dc.

Figure 11:
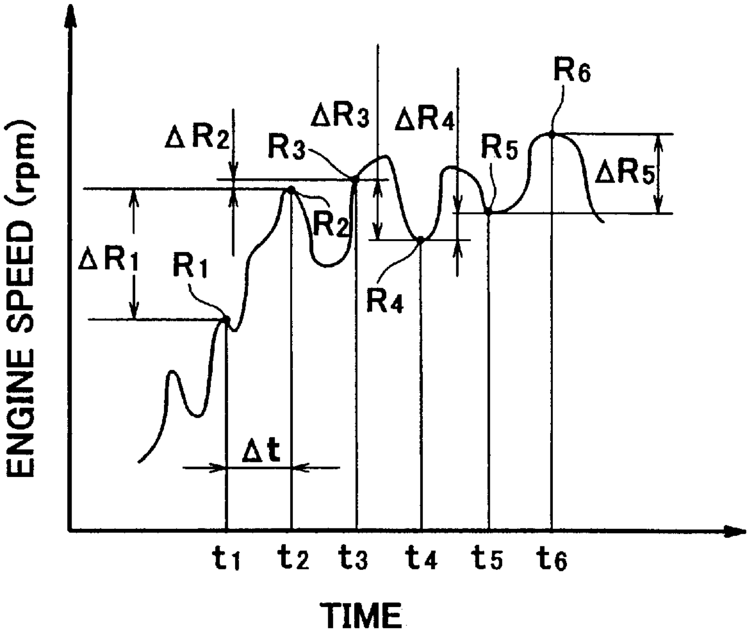
FIG. 11 is a graph showing change of an engine speed with respect to time, for explaining calculation of an engine speed difference value in the cruising speed calculating process of FIG. 10.

Referring to FIG. 11, the engine speed is sampled by the CPU Dc in every clock cycle $\Delta t$ of the CPU Dc and stored in the memory M. During this operation, the CPU Dc may control the engine speed sensor Se to detect the engine speed in every $\Delta t$, and may sample all of the detected engine speeds and store them in the memory M or may partially sample partially-sample) the detected engine speeds. Alternatively, the CPU Dc may control the engine speed sensor Se to partially detect (partially-detect) the engine speeds.

Then, the CPU Dc cumulates difference values $\Delta R_i$ stored in the memory M (Step S43). The CPU Dc refers to the offset table Tc (described in detail later) for the engine speed $R_i$ lastly detected to obtain an offset value $B_{RC}$ for a cumulated value $\Sigma\Delta R_i$ of the difference values $\Delta R_i$ (Step S44). The CPU Dc performs addition/subtraction based on the offset value $B_{RC}$ and the reference cruising speed $B_{Ri}$ obtained in Step S41 to obtain an actual cruising speed $B_{RE}$ (Step S45).

Referring to FIG. 12, assume that the watercraft is being accelerated (see line $A_{RE}$). As can be seen from this graph, the actual cruising speed corresponding to the engine speed represented by line $A_{RE}$ is smaller than the reference cruising speed corresponding to the engine speed represented by line $A_m$. For example, in case of the engine speed "$R_i$" at a point, the corresponding actual cruising speed $B_{RE}$ is lower than the corresponding reference speed $B_{Ri}$. Therefore, the offset value $B_{RC}$ stored in the offset table Tc is subtracted from the reference cruising speed $B_{Ri}$ to obtain the actual cruising speed $B_{RE}$. On the other hand, when the watercraft is being decelerated (not shown), the offset value BRC obtained in the same way is added to the reference cruising speed $B_{Ri}$. In the stationary cruising state (state of the line $A_m$), there is no difference between the reference speed $B_{Ri}$ and the actual cruising speed $B_{RE}$, and therefore the offset value $B_{RC}$ is zero.

Figure 14:
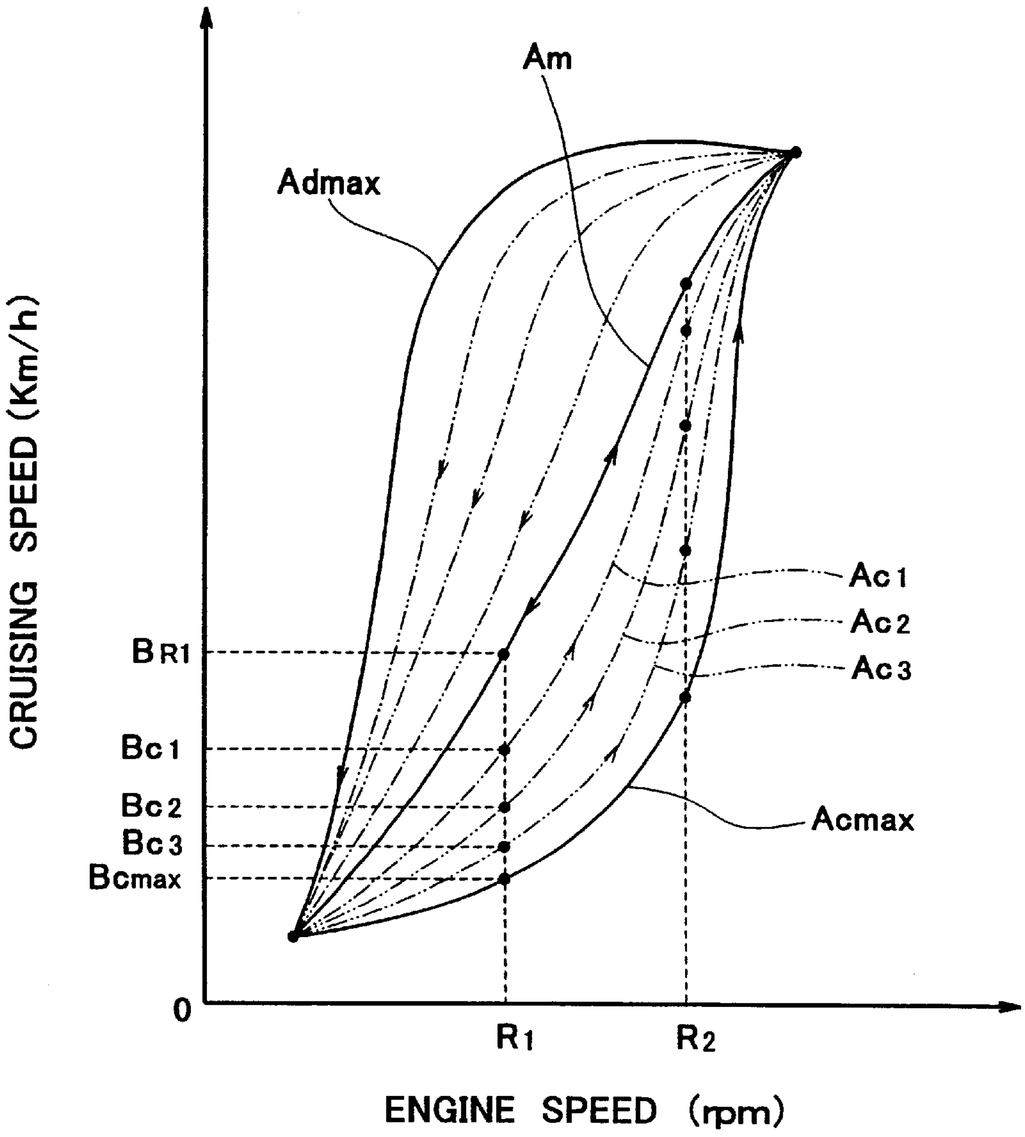
FIG. 14 is a graph showing change of a cruising speed with respect to an engine speed, for explaining a method for obtaining offset values to be stored in the offset table of FIG. 13.

Based on the above-described technique, the offset value $B_{RC}$ is obtained as described below. First, the watercraft is actually cruised in different accelerated/decelerated conditions and the relationship between the engine speed and the actual cruising speed is obtained as shown in the graph of FIG. 14. In FIG. 14, line $A_{cmax}$ shows the relationship between the engine speed and the actual cruising speed at a point of the maximum acceleration of the watercraft and $A_{cmax}$ shows the relationship between the engine speed and the actual cruising speed at a point of the maximum deceleration.

Figure 13:
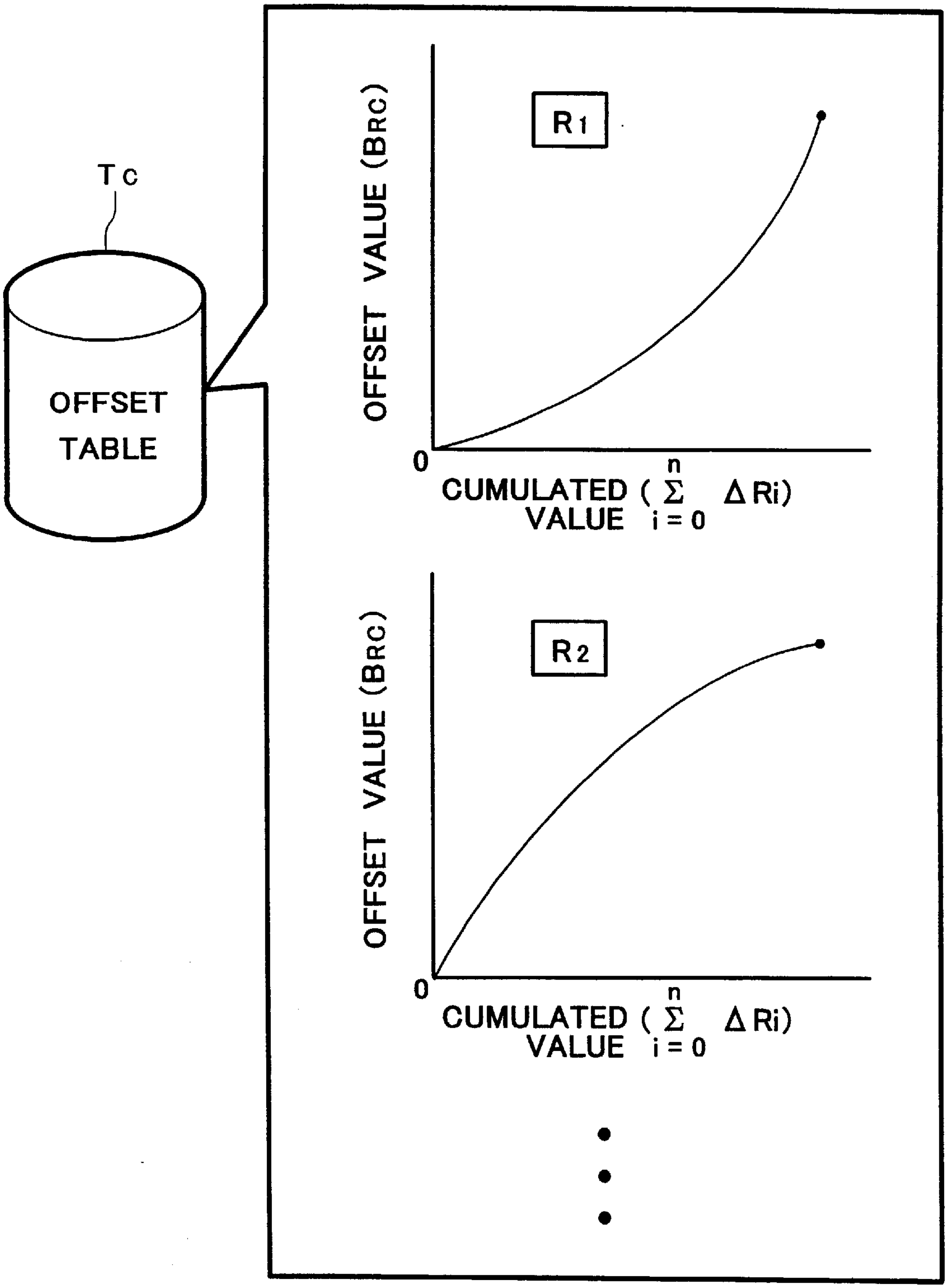
FIG. 13 is a graphic view showing contents of an offset table of FIG. 6.

Here, assume that the watercraft is being accelerated as shown in the line $A_{C1}$ of FIG. 14. In this accelerated state, when the engine speed is "$R_1$" and the actual cruising speed is "$B_{C1}$", the corresponding offset value $B_{RC}$ is obtained by $B_{R1}-B_{C1}$. A cumulated value $\Sigma\Delta R_i$ of the engine speed $R_1$ and the previously detected engine speeds is calculated according to the above-described procedure. Likewise, calculation is carried out for other accelerated states such as the lines $A_{c2}$, $A_{c3}$, . . . , $A_{cmax}$ and the relationship between the offset value $B_{RC}$ and the cumulated value $\Sigma\Delta R_i$ is stored in the offset table Tc for every engine speed as shown in FIG. 13. That is, the table thus created and showing the relationship between the offset value $B_{RC}$ and the cumulated value $\Sigma\Delta R_i$ is stored for every engine speed, and is referred to on the basis of the lastly detected engine speed, i.e., the engine speed at this point. Of course, a similar process is carried out for the decelerated states.

In this embodiment, the contents stored in the speed conversion table Ts and the contents stored in the offset table Tc are respectively represented by converting the graphs of FIGS. 12, 13 into data stored in the tables. Alternatively, these graphs may be converted into an arithmetic expression using the engine speed as a parameter, and the actual cruising speed may be calculated according to the arithmetic expression.

In the personal watercraft of this embodiment, it is desirable that the actual cruising speed is obtained at intervals of 0.5 second, one second, or the like. The actual cruising speed thus obtained can be employed in the steering assist mode control, a cruising speed meter, and the like.

As should be appreciated from the foregoing description, the personal watercraft of this embodiment can be easily embodied merely by additionally providing the steering position sensor Sp comprising the proximity switches and the like and changing the computer program of the electric control unit Ec, because the conventional personal watercraft is equipped with the throttle position sensor Sb, the engine speed sensor Se, and the electric control unit Ec.

Figure 15:
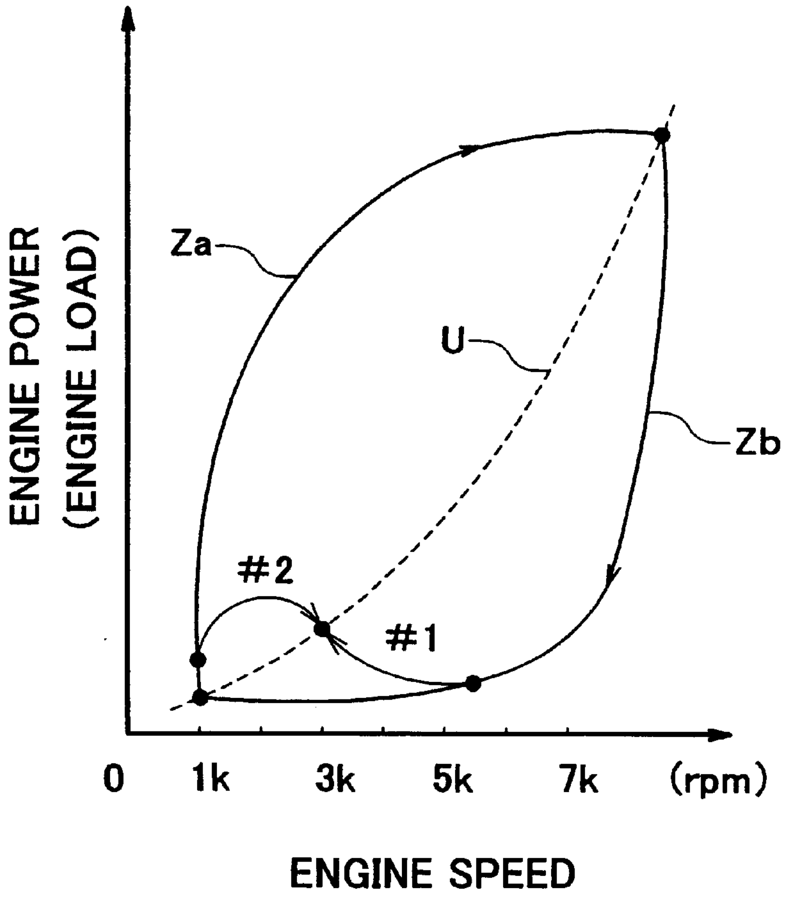
FIG. 15 is a graph showing a hysteresis characteristic between an engine speed and an engine power (engine load), and a propulsion force characteristic of a water jet pump associated with the hysteresis characteristic.

FIG. 15 is a graph showing a hysteresis characteristic between the engine speed and the engine power (engine load), with the engine speed on a lateral axis (1*k* represents "1000") and the engine power on a longitudinal axis. A dashed line U indicates the propulsion force of the water jet pump P. For example, when the rider performs throttle-open operation without the steering assist mode control, the engine speed is increased with a degree at which the throttle is opened and the engine power is increased along an ascending line Za. On the other hand, when the rider performs the throttle-close operation in the cruising state, the engine speed is decreased with a degree at which the throttle is closed and the engine power is decreased along a descending line Zb.

Here, it is assumed that the predetermined value at which the steering assist mode control starts is set to 5500 rpm. When the rider performs throttle-close operation when the watercraft is cruising at the engine speed higher than 5500 rpm, the engine speed is decreased in a relatively short time. If the steering assist mode control is started when the engine speed is decreased to 5500 rpm, the engine speed is maintained at 3000 rpm (engine speed set under the steering assist mode control) or more upon the steering assist mode control being executed. Accordingly, the propulsion force sufficient to turn the watercraft is obtained (pattern #1). In this case, when the steering assist mode control starts, the watercraft is cruising at the engine speed higher than 3000 rpm, and therefore, the engine speed is decreased but the engine power is increased up to 3000 rpm on the dashed line U.

In the pattern #1, the engine speed is apparently decreased after the steering assist mode control is executed. In actuality, however, the engine speed to be decreased in a very short time is maintained at a level (3000 rpm on the dashed line U) at which the propulsion force sufficient to turn the watercraft is obtained. Depending on the controlled speed, there is a possibility that the engine speed becomes temporarily lower than 3000 rpm.

When the steering assist mode control is executed in a state in which the engine speed is lower than 3000 rpm, the engine speed is increased up to 3000 rpm on the dashed line U. Accordingly, the propulsion force sufficient to turn the watercraft is obtained (pattern #2). In this case, when the steering assist mode control starts, the degree at which the engine power is increased is relatively higher than the degree at which the propulsion force is increased, but the engine power is gradually decreased with an increase in the cruising speed of the watercraft.

When the steering assist mode control is started in the state in which the engine speed is 5500 rpm or less on the descending line Zb, the engine speed can be decreased to 3000 rpm on the dashed line U by substantially changing the fuel injection timing, the ignition timing, or these timings and the fuel injection amount and without actually changing the position of the throttle.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meters and bounds of the claims, or equivalence of such meters and bounds thereof are therefore intended to be embodied by the claims.

What is claimed is:

1. A jet-propulsion watercraft comprising:

a water jet pump including an outlet port and a steering nozzle, said water jet pump pressurizing and accelerating sucked water and ejecting the water from the outlet port to propel the watercraft as a reaction of the ejecting water;

an engine for driving the water jet pump;

a steering operation means operating in associated with the steering nozzle of the water jet pump;

a steering position sensor for detecting a predetermined steering position of the steering operation means;

an engine speed sensor for detecting an engine speed of the engine;

a cruising speed calculating means to calculate a cruising speed of the watercraft from the engine speed detected by the engine speed sensor; and an electric control unit, wherein the electric control unit is adapted to increase the engine speed while a result detected by the steering position sensor is the predetermined steering position and the cruising speed calculated by the cruising speed calculating means is within a predetermined speed range.

2. The jet-propulsion watercraft according to claim 1, wherein the cruising speed calculating means includes a speed conversion table that stores relationship between the engine speed and the cruising speed and is adapted to refer to the speed conversion table based on the engine speed detected by the engine speed sensor and read out the cruising speed stored in the speed conversion table and associated with the detected engine speed.

3. The jet-propulsion watercraft according to claim 2, wherein the cruising speed calculating means further comprises:

an offset table that stores an offset value used for offsetting the cruising speed stored in the speed conversion table according to a degree of acceleration/deceleration of the engine; and an obtaining means for obtaining the degree of acceleration/deceleration of the engine, and wherein the cruising speed calculating means is adapted to read out the offset value stored in the offset table and associated with the degree of acceleration/deceleration obtained by the obtaining means, and offset the cruising speed read from the speed conversion table, based on the read offset value.

4. The jet-propulsion watercraft according to claim 3, wherein the obtaining means comprises:

an engine speed memory for sequentially storing the engine speed detected by the engine speed sensor in each predetermined time cycle;

a calculating means for calculating a difference value between a first engine speed stored in the engine speed memory and a second engine speed previously detected and stored in the engine speed memory;

a difference value memory for sequentially storing the difference value calculated by the calculating means; and a cumulating means for cumulating difference values stored in the difference value memory, wherein the obtaining means is adapted to calculate the degree of acceleration/deceleration of the engine based on a value cumulated by the cumulating means.

5. The jet-propulsion watercraft according to claim 3, wherein the obtaining means comprises:

an engine speed memory for storing the engine speed detected by the engine speed sensor, sequentially and in each predetermined time cycle;

a calculating means for calculating a difference value between a first engine speed stored in the engine speed memory and a second engine speed previously detected and stored in the difference value memory;

a difference value memory for sequentially storing the difference value calculated by the calculating means; and a cumulating means for cumulating difference values stored in the difference value memory, and wherein the obtaining means is adapted to calculate the degree of acceleration/deceleration of the engine based on a value cumulated by the cumulating means.

6. The jet-propulsion watercraft according to claim 1, wherein the electric control unit is adapted to increase the engine speed to increase the propulsion force of the watercraft.

7. The jet-propulsion watercraft according to claim 1, further comprising:

a throttle-close operation sensor for detecting a throttle-close operation, and wherein the electric control unit is adapted to increase the engine speed while the result detected by the steering position sensor is the predetermined steering position, the throttle-close operation is detected by the throttle-close operation sensor, and the value calculated by the cruising speed calculating means is within the predetermined speed range.

8. The jet-propulsion watercraft according to claim 1, wherein the electric control unit is adapted to increase the engine speed while the result detected by the steering position sensor is the predetermined steering position, a decrease of a predetermined engine speed is detected from a result detected by the engine speed sensor, and the value calculated by the cruising speed calculating means is within the predetermined speed range.

9. The jet-propulsion watercraft according to claim 1, further comprising:

a throttle position sensor for detecting a throttle-close operation, and wherein the electric control unit is adapted to increase the engine speed while the result detected by the steering position sensor is the predetermined steering position, the throttle-close operation is detected by the throttle position sensor, and the value calculated by the cruising speed calculating means is within the predetermined speed range.

10. The jet-propulsion watercraft according to claim 1, wherein the engine includes a fuel injection system, and the electric control unit is adapted to increase the engine speed by changing the fuel injection timing of the fuel injection system.

11. The jet-propulsion watercraft according to claim 1, wherein the engine includes an ignition system, and the electric control unit is adapted to increase the engine speed by changing the ignition timing of the ignition system.

12. The jet-propulsion watercraft according to claim 1, wherein the engine includes a fuel injection system, and the electric control unit is adapted to increase the engine speed by changing the fuel injection amount of the fuel injection system.

13. The jet-propulsion watercraft according to claim 1, wherein the engine includes a fuel injection system and an ignition system, and the electric control unit is adapted to increase the engine speed by changing the fuel injection timing of the fuel injection system, the ignition timing of the ignition system and the fuel injection amount of the fuel injection system.

14. The jet-propulsion watercraft according to claim 1, wherein the electric control unit is adapted to increase the engine speed up to approximately 2500 rpm–3500 rpm.

15. The jet-propulsion watercraft according to claim 1, wherein the electric control unit is adapted not to increase the engine speed while the value calculated by the cruising speed calculating means is within an idling range.

16. The jet-propulsion watercraft according to claim 1, wherein the electric control unit is adapted to increase the engine speed when the watercraft is moving rearward.

17. The jet-propulsion watercraft according to claim 16, wherein the electric control unit is adapted to increase the engine speed while the value calculated by the cruising speed calculating means is within an idling range.

18. The jet-propulsion watercraft according to claim 16, wherein the electric control unit is adapted to increase the engine speed up to approximately 2500 rpm–3500 rpm.

19. A cruising speed calculating device for a jet-propulsion watercraft provided with a water jet pump that pressurizes and accelerates sucked water and ejects the water to propel the watercraft as a reaction of the ejecting water, said cruising speed calculating device comprising:

an engine speed sensor for detecting an engine speed of an engine for driving the water jet pump; and a cruising speed calculating means for calculating a cruising speed of the watercraft based on the engine speed detected by the engine speed sensor, wherein the cruising speed calculating means includes a speed conversion table that stores relationship between the engine speed and the cruising speed and is adapted to refer to the speed conversion table based on the engine speed detected by the engine speed sensor and read out the cruising speed stored in the speed conversion table and associated with the detected engine speed.

20. The cruising speed calculating device according to claim 19, wherein the cruising speed calculating means comprises:

an offset table that stores an offset value used for offsetting the cruising speed stored in the speed conversion table according to a degree of acceleration/deceleration of the engine; and an obtaining means for obtaining the degree of acceleration/deceleration of the engine, and wherein the cruising speed calculating means is adapted to read out the offset value stored in the offset table and associated with the degree of acceleration/deceleration obtained by the obtaining means, and offset the cruising speed read from the speed conversion table based on the read offset value.

21. The cruising speed calculating device according to claim 20, wherein the obtaining means comprises:

an engine speed memory for sequentially storing the engine speed detected by the engine speed sensor in every predetermined time cycle;

a calculating means for calculating a difference value between a first engine speed stored in the engine speed memory and a second engine speed previously detected and stored in the engine speed memory;

a difference value memory for sequentially storing the difference value calculated by the calculating means; and a cumulating means for cumulating difference values stored in the difference value memory, and wherein the obtaining means is adapted to calculate the degree of acceleration/deceleration of the engine based on a value cumulated by the cumulating means.

22. The cruising speed calculating device according to claim 20, wherein the obtaining means comprises:

an engine speed memory for storing the engine speed detected by the engine speed sensor, sequentially and in every predetermined time cycle;

a calculating means for calculating a difference value between a first engine speed stored in the engine speed memory and a second engine speed previously detected and stored in the engine speed memory;

a difference value memory for sequentially storing the difference value calculated by the calculating means; and a cumulating means for cumulating difference values stored in the difference value memory, and wherein the obtaining means is adapted to calculate the degree of acceleration/deceleration of the engine based on a value cumulated by the cumulating means.

23. A jet-propulsion watercraft comprising:

a water jet pump including an outlet port and a steering nozzle, said water jet pump pressurizing and accelerating sucked water and ejecting the water from the outlet port to propel the watercraft as a reaction of the ejecting water;

an engine for driving the water jet pump;

a steering operation means operating in association with the steering nozzle of the water jet pump;

a steering position sensor for detecting a predetermined steering position of the steering operation means;

an engine speed sensor for detecting an engine speed of the engine;

a cruising speed calculating means for calculating a cruising speed of the watercraft based on the engine speed detected by the engine speed sensor; and an electric control unit, wherein the electric control unit is adapted to increase the engine speed up to approximately 2500 rpm–3500 rpm, while a result detected by the steering position sensor is the predetermined steering position and a value calculated by the cruising speed calculating means is within a predetermined speed range.

24. A jet-propulsion watercraft comprising:

a water jet pump including an outlet port and a steering nozzle, said water jet pump pressurizing and accelerating sucked water and ejecting the water from the outlet port to propel the watercraft as a reaction of the ejecting water;

an engine for driving the water jet pump;

a steering operation means operating in association with the steering nozzle of the water jet pump;

a steering position sensor for detecting a predetermined steering position of the steering operation means;

an engine speed sensor for detecting an engine speed of the engine;

a cruising speed calculating means for calculating a cruising speed of the watercraft based on the engine speed detected by the engine speed sensor; and an electric control unit, wherein the electric control unit is adapted to increase the engine speed while a result detected by the steering position sensor is the predetermined steering position and a value calculated by the cruising speed calculating means is within a predetermined speed range, and wherein the electric control unit is adapted not to increase the engine speed while a result detected by the steering position sensor is the predetermined steering position and the value calculated by the cruising speed calculating means is within an idling range.

* * * * *

UNITED STATES PATENT AND TRADEMARK OFFICE

CERTIFICATE OF CORRECTION

PATENT NO. : 6,568,968 B2 
DATED : May 27, 2003
INVENTOR(S) : Yoshimoto Matsuda

It is certified that error appears in the above-identified patent and that said Letters Patent is hereby corrected as shown below:

Column 12,
Line 13, please change “in associated with” to -- in association with --.

Signed and Sealed this

Sixteenth Day of September, 2003

JAMES E. ROGAN
*Director of the United States Patent and Trademark Office*